April 21, 1953 A. POTDEVIN 2,635,511
APPARATUS FOR MAKING SACKS
Filed April 27, 1948 11 Sheets-Sheet 1
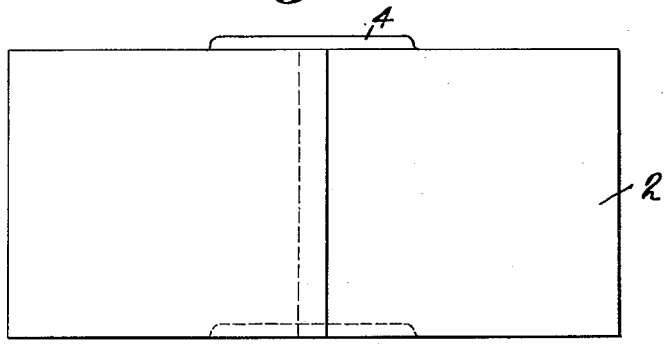
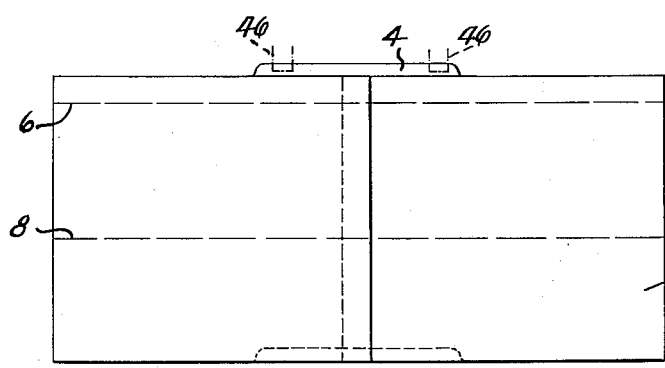
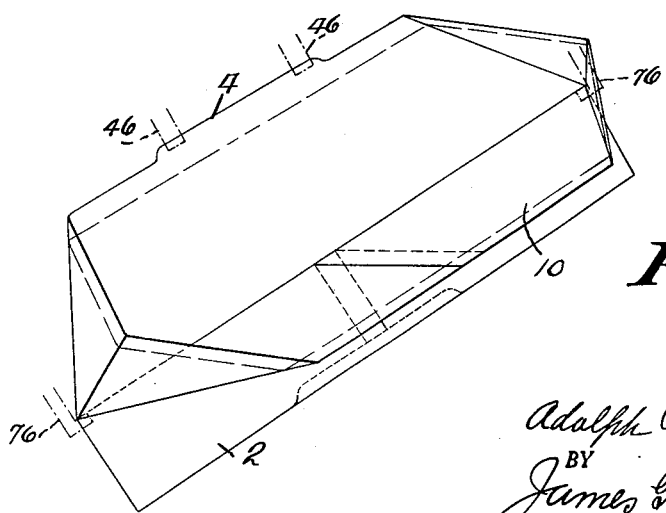
INVENTOR.
Adolph Potdevin
BY James G. Bethell
ATTORNEY April 21, 1953  A. POTDEVIN  2,635,511
APPARATUS FOR MAKING SACKS
Filed April 27, 1948  11 Sheets-Sheet 2

INVENTOR.
Adolph Potdevin
BY James G. Bethell
ATTORNEY

April 21, 1953      A. POTDEVIN      2,635,511
APPARATUS FOR MAKING SACKS

Filed April 27, 1948      11 Sheets-Sheet 4

INVENTOR
Adolph Potdevin
BY
James G. Bechell
ATTORNEY

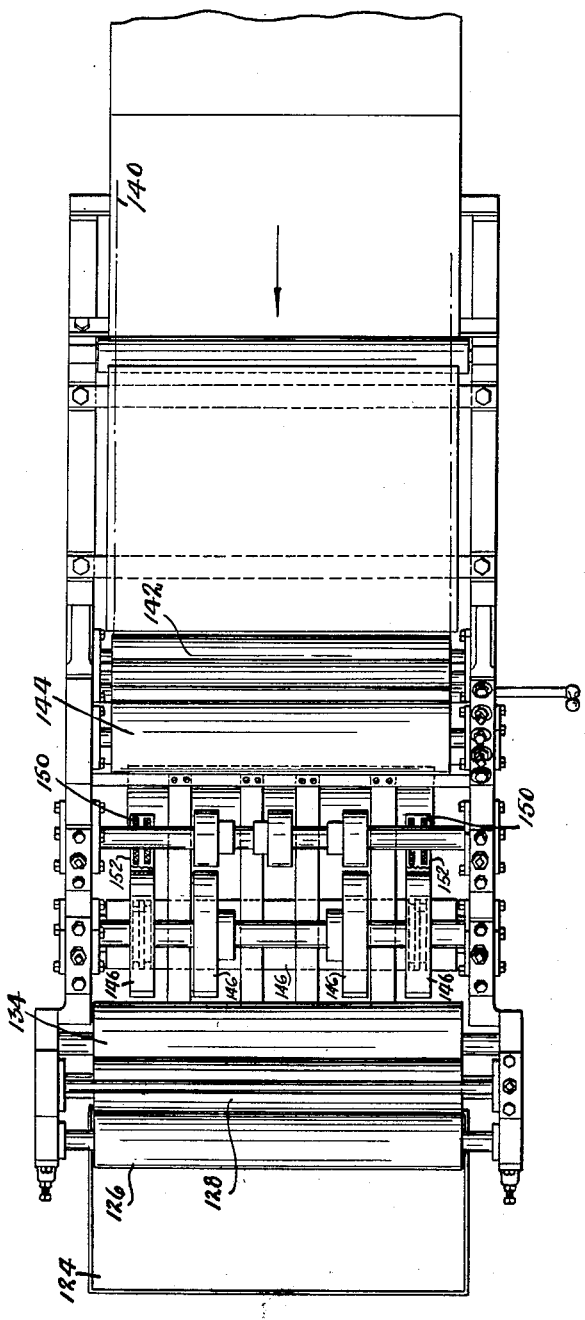

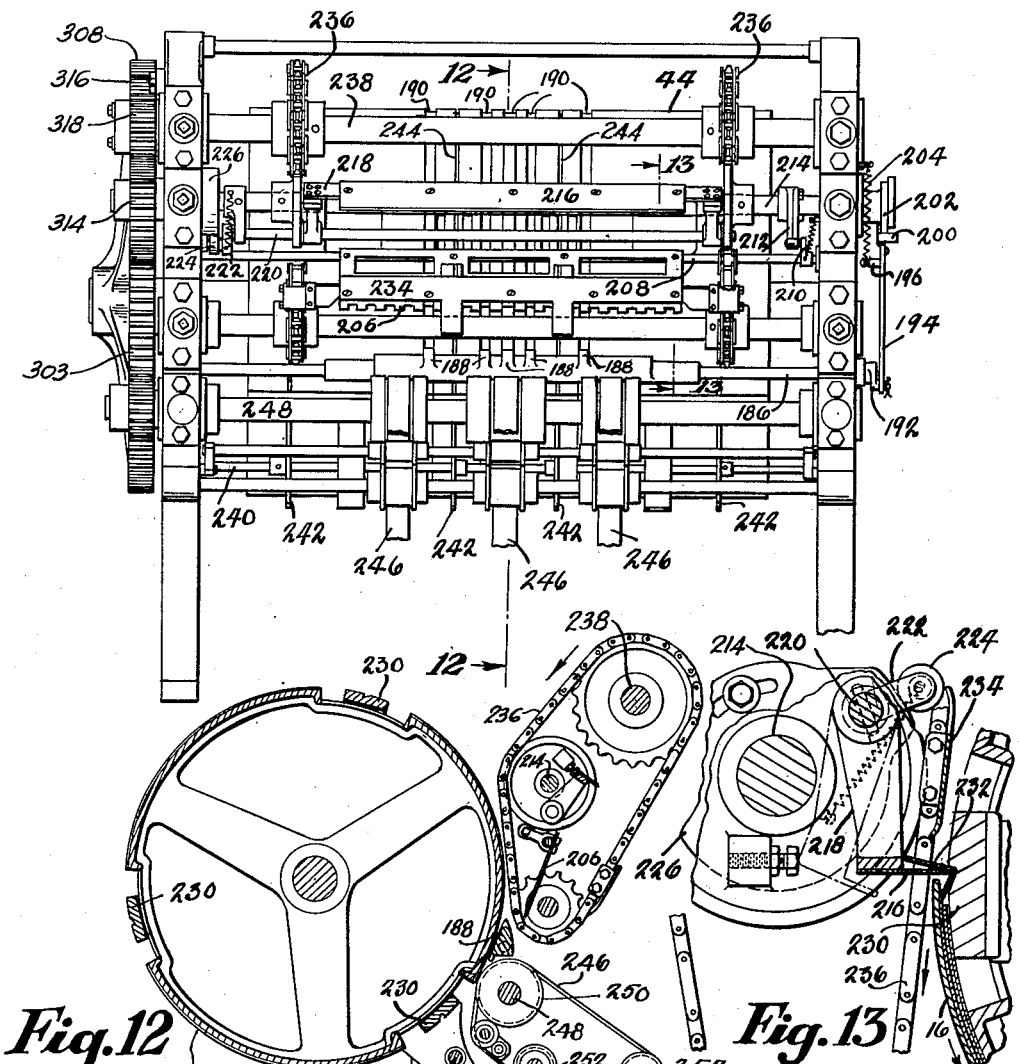

April 21, 1953  A. POTDEVIN  2,635,511
APPARATUS FOR MAKING SACKS
Filed April 27, 1948  11 Sheets-Sheet 7
*Fig. 14*
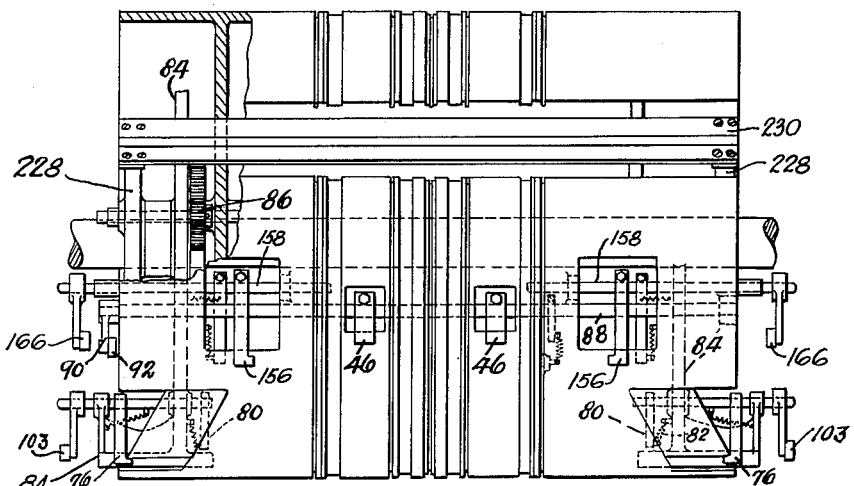
*Fig. 15*
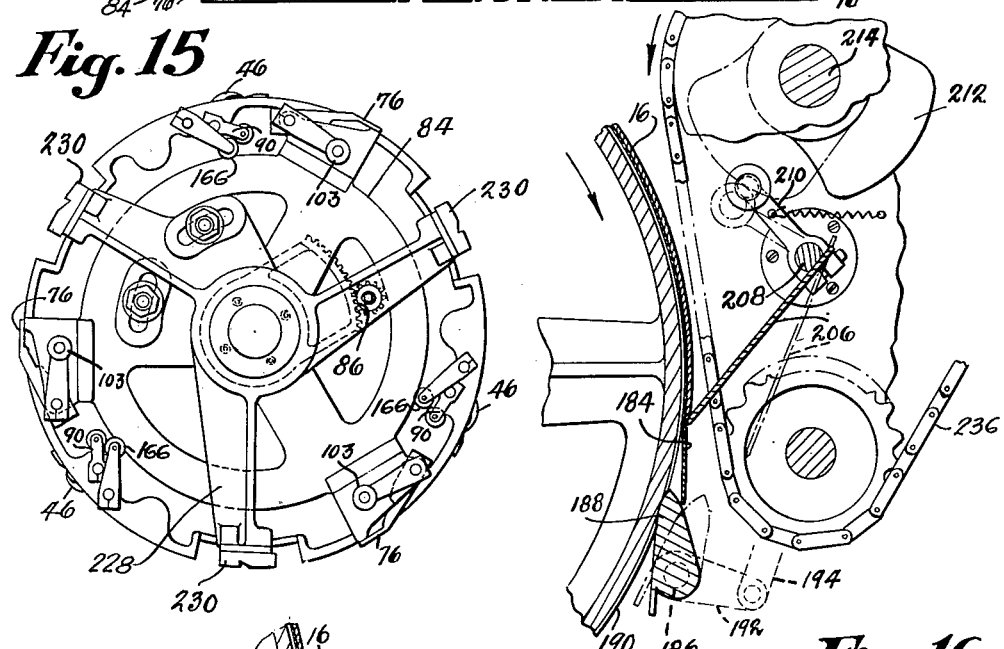
*Fig. 16*
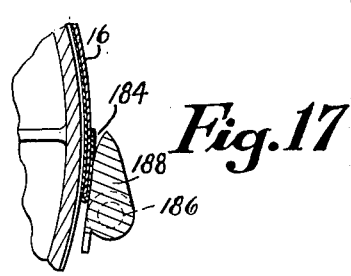
*Fig. 17*
INVENTOR.
Adolph Potdevin
BY
James G. Bethell
ATTORNEY April 21, 1953  A. POTDEVIN  2,635,511
APPARATUS FOR MAKING SACKS
Filed April 27, 1948  11 Sheets-Sheet 8

INVENTOR.
Adolph Potdevin
BY James G. Bethell
ATTORNEY

April 21, 1953  A. POTDEVIN  2,635,511
APPARATUS FOR MAKING SACKS
Filed April 27, 1948  11 Sheets-Sheet 10

April 21, 1953 A. POTDEVIN 2,635,511
APPARATUS FOR MAKING SACKS
Filed April 27, 1948 11 Sheets-Sheet 11
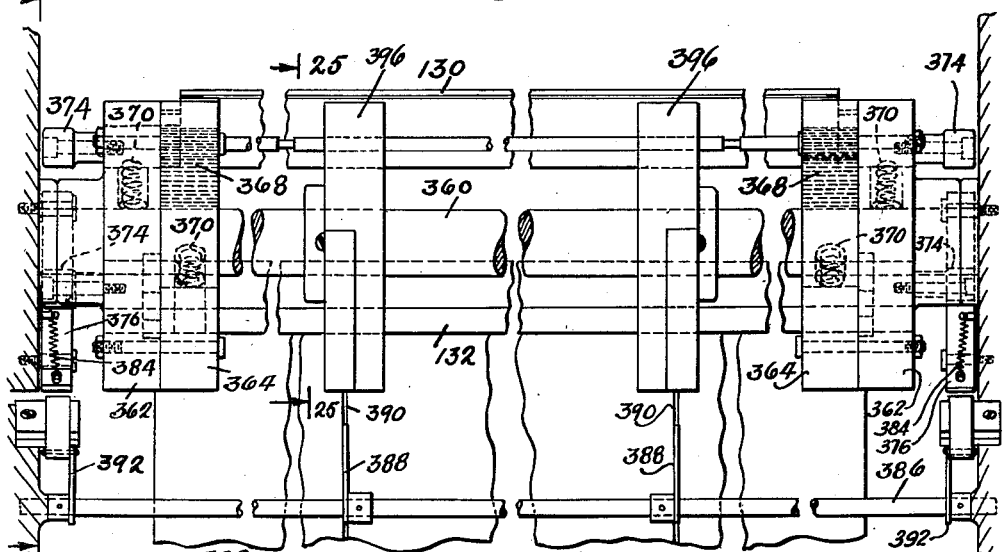
Fig. 22
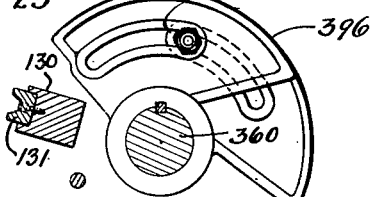
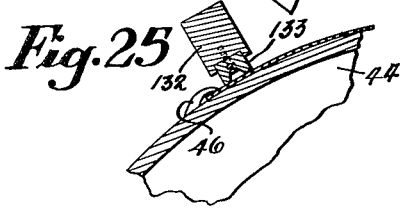
Fig. 25
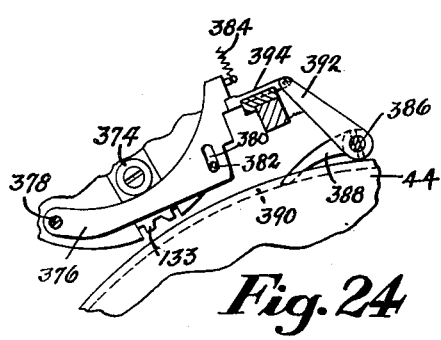
Fig. 24
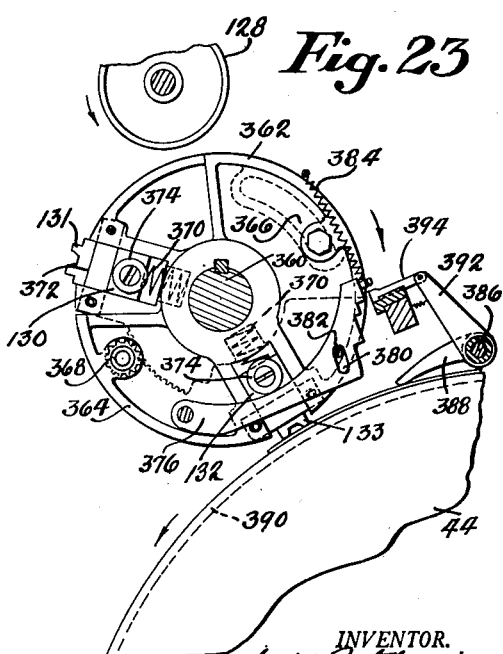
Fig. 23
INVENTOR.
Adolph Potdevin
BY James G. Bethell
ATTORNEY Patented Apr. 21, 1953

2,635,511

UNITED STATES PATENT OFFICE 2,635,511

APPARATUS FOR MAKING SACKS

Adolph Potdevin, Garden City, N. Y., assignor to Potdevin Machine Company, Brooklyn, N. Y., a corporation of New York Application April 27, 1948, Serial No. 23,458

12 Claims. (Cl. 93—23)

This invention is directed to a method of and apparatus for making paper sacks.

These sacks, as they are known commercially, differ from the ordinary paper bag, in that the bottom is composed of a different material, in this case, chipboard, from the sides or body of the sack which is composed of paper bag stock.

The sacks of this invention are adapted for many uses, but are used extensively for the shipment of empty paper milk containers. These containers are clean when they leave the manufacturing plant and it is very desirable that they arrive in the same condition at their destination. It is very desirable also that damage to the containers in transit be avoided.

The sack produced by the method and apparatus of the instant invention is of such construction that the cartons or containers may be sealed therein for shipment, and the package will withstand the handling met with in transit, without danger of breaking, so that the cartons or containers will arrive at their destination in perfect condition.

The machine of this invention produces the sacks in a collapsed or flattened condition, which is of convenience in transporting the empty sacks from the point of manufacture to the point of use.

In the accompanying drawings:

Figs. 1 to 6 inclusive, illustrate the sack in its various stages of manufacture;

Fig. 1 being a plan view of the sack tube;

Fig. 2 being a view of Fig. 1 showing the sack tube after it has been scored;

Fig. 3 being an isometric view of the body of the sack showing the same as it is being opened preparatory to pasting, etc;

Fig. 4 being a plan view of the body of the sack after it has been completely opened and collapsed and paste applied to the leading end of the lower wall of the sack body.

Fig. 5 being a plan view of the chipboard which is to constitute the sack bottom;

Fig. 6 showing the chipboard in place; while

Fig. 9 is a view similar to Fig. 8 taken from the opposite side of the machine;

Fig. 10 is a plan view of the upper part of the machine illustrating the cut-off and gluing mechanisms for the chipboard;

Fig. 11 is an elevational view of the left-hand portion of the machine as illustrated in Fig. 8, looking from left to right;

Fig. 12 is a sectional view taken substantially on the line 12—12 of Fig. 11;

Fig. 13 is an enlarged detail view taken substantially on the line 13—13 of Fig. 11;

Fig. 14 is an elevational view of the drum of Fig. 8, looking from right to left;

Fig. 15 is an elevational view of the left hand end of the drum of Fig. 14;

Figs. 16 and 17 are part sectional views illustrating the mechanism by which the body of the sack is attached to the chipboard bottom;

Fig. 22 is a side elevational view of the mechanism for applying paste to the sack lengths and for pressing the bottoming member of the sack upon the sack body;

Fig. 23 is a fragmentary view taken along line 23—23 Fig. 22, showing the end of the mechanism of Fig. 22 in cooperation with the bottoming drum;

Fig. 24 is a fragmentary view illustrating the position assumed by a paste bar when no sack length is upon the bottoming drum; and Fig. 25 is a view substantially on the line 25—25 of Fig. 22.

In order that a clear understanding may be had of this invention, reference, first of all, will be made to Figs. 1 to 7, both inclusive, which as above pointed out, illustrate the sack in its various stages of manufacture, as well as the completed sack.

The paper from which the body of the sack is made is drawn off a roll, tubed and cut into lengths, much the same as in the manufacture of ordinary paper bags.

In Fig. 1 a sack length has been shown and is designated 2. As will be explained later, a projecting flap 4 is provided on one wall of the sack length at its leading end, in the cutting-off operation.

The sack length is next scored transversely at 6 and 8. This scoring is illustrated in Fig. 2 and is a marked improvement over a single score at 8 customarily employed.

In the next stage of manufacture, the upper wall 10 of the sack length is folded back upon itself from the leading end. This fold takes place along the score 8. This step has been illustrated in progress in Fig. 3 while Fig. 4 shows the sack length fully folded back and lying flat.

Figure 4:
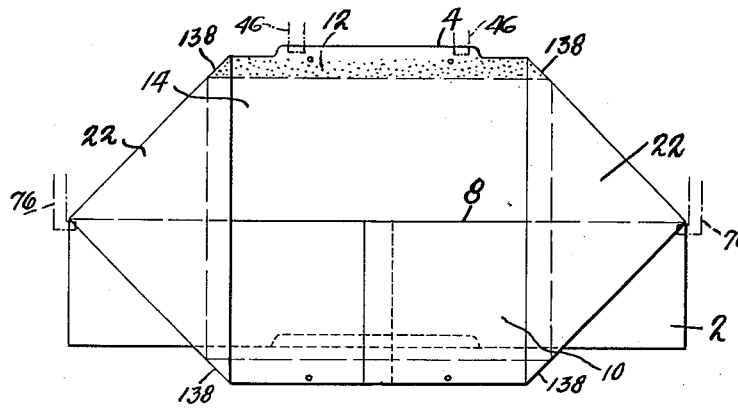

Plate 12 is applied next across the leading end of the lower wall 14 of the sack length as illustrated in Fig. 4.

Figure 5:
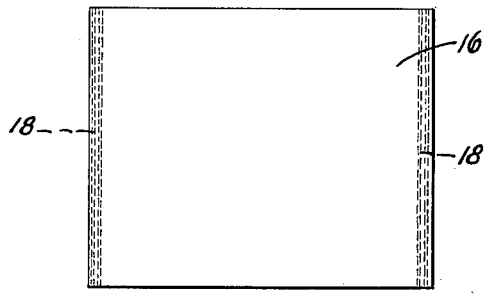

In Fig. 5 a length of chipboard 16 has been illustrated. This is to constitute the bottom or bottom member of the sack and has paste applied along its two side edges as shown at 18. This bottoming member is superimposed upon the sack body after the latter has been folded back upon itself.

After the chipboard bottoming member is placed in position and paste has been applied to the trailing end of the upper wall 10 the ends of the upper and lower walls of the sack length are folded over upon the chipboard, so that the chipboard bottom is then adhesively attached to the sack body along all four sides of the chipboard. If desired, the pasting of the chipboard may be omitted and four stripes of paste applied to the sack length. It has been found, however, that the procedure described is more satisfactory, particularly in a high speed, full automatic machine.

Figure 6:
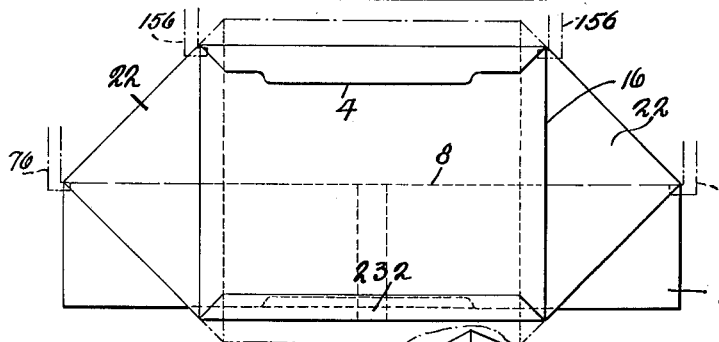
Figure 7:
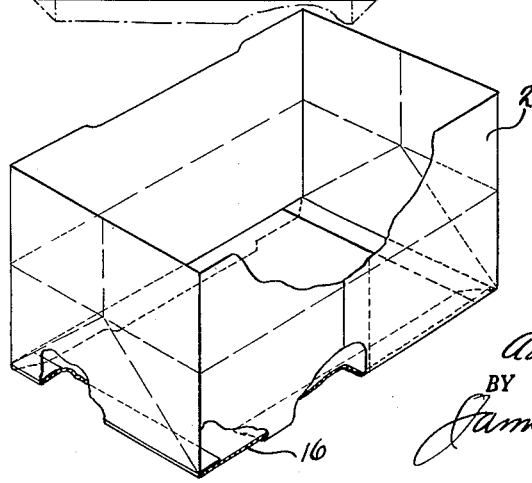
Fig. 7 is an isometric view partly broken away of the completed sack open and ready for filling.

In will be understood by a comparison of Fig. 6 with Fig. 7, for example, that Fig. 6 is a bottom plan view of the sack.

It will be noted from Fig. 7 that when the sack is opened for filling as illustrated in Fig. 7, the paper of the sack length overlies the chipboard across the two narrow sides of the sack while across the two long sides of the sack the chipboard overlies the paper. These overlaps make for a very strong bottom, so that danger of separation of the chipboard bottom from the sack body is eliminated.

Attention is directed also to the reinforcing effect obtained at the four corners of the sack bottom. When the upper wall 10 of the sack length is folded back upon itself along the scoring 8, a portion of the lower wall will be folded over at the same time, so that it might be said that both walls of the sack length or a portion of both walls at the sides of the length are folded inwardly to provide two triangularly shaped portions 22 which are two plies thick. When the chipboard 16 is superimposed upon the sack length, as above explained, it overlies these triangularly shaped portions 22 of the sack length along the base of each portion, and when the pasted areas of the sack body are folded over upon the chipboard, the corners of the sack bottom will be composed of two plies of paper at the back of the chipboard as well as two plies on the front, as compared with but a single ply of paper at the back and another single ply at the front of the chipboard.

The above outline of the sack itself along with a brief reference to the steps employed in fabricating the sack will be helpful in understanding the construction and operation of the machine itself, which will now be described.

*The paper cut-off*

The paper is drawn continuously off a supply roll when the machine is in operation, tubed and cut off into sack lengths. The tubing mechanism has not been illustrated inasmuch as this may be similar to the tubing mechanism employed in conventional paper bag machines.

The paper designated 24 is tubed about stationary plate 26, and as the tubed paper moves a predetermined distance it is cut off by striker bar 28 carried by chains 275. This severs the tubed paper into sack lengths. The cut-off mechanism just described is merely illustrative, inasmuch as other constructions known in the art may be used to good advantage. In this cutting-off operation the flap 4 is formed in the lower wall of the sack length at its leading end.

The sack lengths are advanced successively by segmental forwarding rollers 30 to scoring mechanism where each length is scored transversely at 6 adjacent its leading end and at some distance to the rear of score 6, as shown at 8, see Fig. 2.

*Scoring mechanism*

Figure 18:
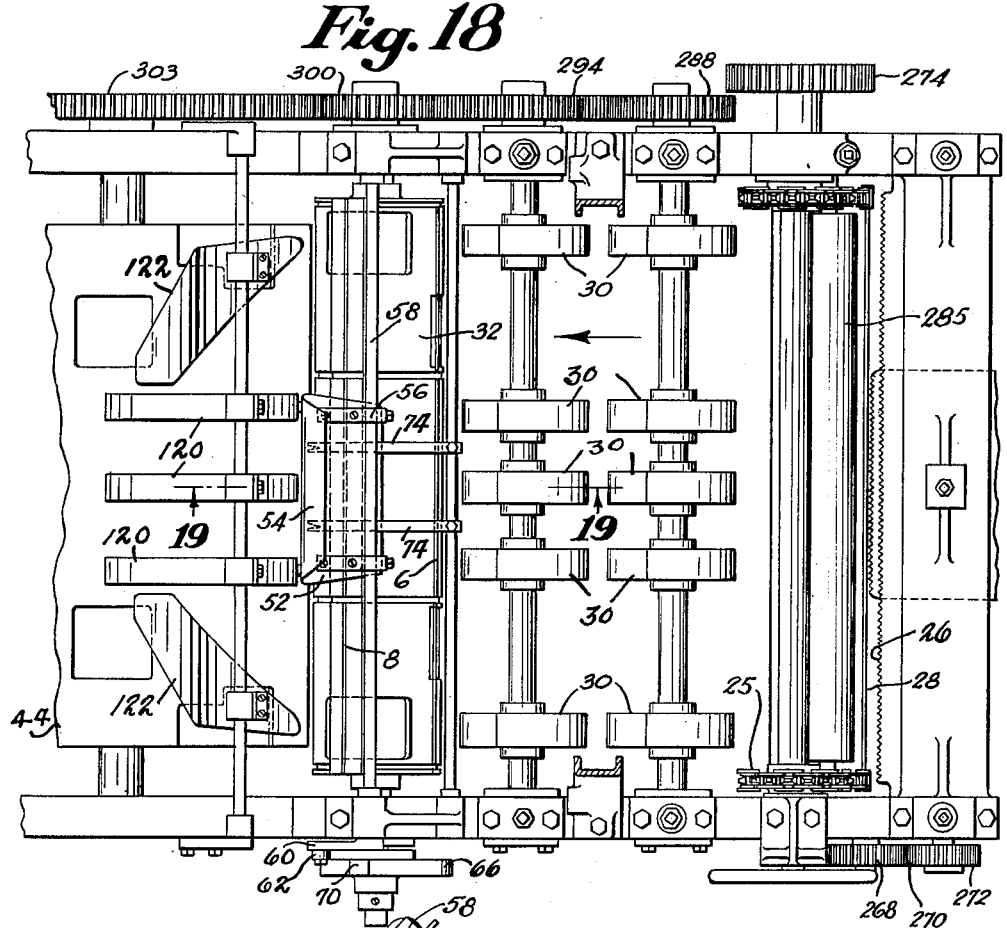
Fig. 18 is a plan view showing the paper cut-off, forwarding mechanism and the mechanism for opening the sack tube prior to application of the bottom.
Figure 19:
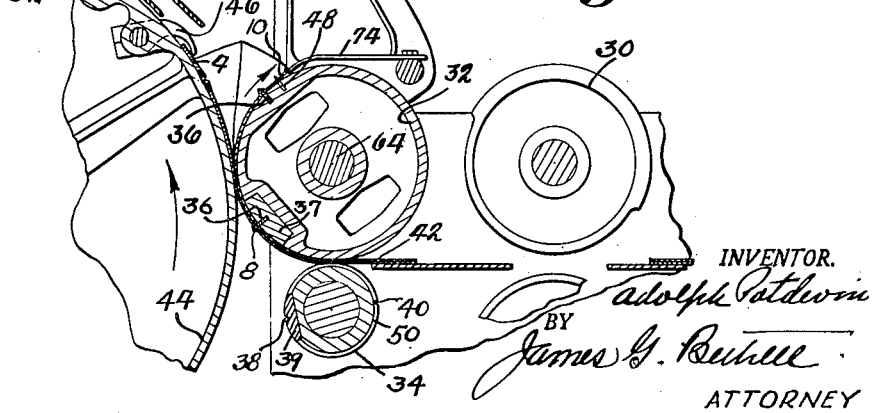
Fig. 19 is a view taken about on the line 19—19 of Fig. 18, showing the tube-opening mechanism on an enlarged scale with reference to Fig. 18, and with the parts rotated slightly from the positions shown in Fig. 18.

The mechanism for scoring each sack length transversely as shown at 6 and 8, Fig. 2, is best seen in Fig. 19. Reference may be had at the same time to Figs. 8 and 18.

As will be seen from the drawings, the scoring mechanism comprises two cooperating scoring cylinders 32 and 34, lying in the path of the sack lengths as they are advanced successively by the forwarding rollers 30. The roller 32 as illustrated in Fig. 19, is provided with spaced scoring blades 36, one or both of which may be mounted in blocks 37 set into the roller, the blades which extend lengthwise of the roller or cylinder projecting from the face thereof.

The roller 34 is provided on its periphery with two longitudinally extending grooves 38 and 40 which cooperate with the blades 36, one or both of which may be formed in a block 39 set into the roller. The scoring blades 36 and grooves 38 and 40 are spaced apart peripherally of the rollers or cylinders 32 and 34 a distance corresponding to the desired spacing of the scores 6 and 8. It will be understood also that this spacing is readily varied to permit of handling sack lengths of different dimensions by substituting other blocks for the blocks 37 and 39 without the necessity of substituting different rollers for the rollers or cylinders 32 and 34.

In Fig. 19 a sack length has been designated 42, and from an inspection of this figure of the drawings it will be seen that both walls of the sack length 42 have been scored as described.

*Mechanism for opening the leading end of each sack length and folding it back upon itself*

As hereinabove pointed out, scoring of a sack length is followed by opening the leading end of the sack length and folding the upper wall back upon itself as illustrated in Figs. 3 and 4.

Referring to Figs. 8, 18, 19 and 20, it will be seen that 44 designates a large drum in the path of the sack lengths as they pass through the scoring mechanism just described.

This drum 44, referred to hereinafter as the bottoming drum, carries one or more sets or pairs of flap-clamping fingers or grippers 46 on its periphery, these grippers being raised by a cam and lowered into gripping position by a spring. For illustration and descriptive purposes only, three sets of these grippers have been shown.

The cams for raising the grippers will be referred to presently.

The function of the grippers 46 is to grip the projecting flap 4 of the sack length as the leading end of each length comes up to the drum 44.

It will be appreciated that the grippers 46 are equally spaced about the periphery of the bottoming drum, and the drum is so timed that a set of grippers is in position to grip a flap as each sack length comes up to the drum.

As illustrated in Fig. 19, the scoring cylinder 32 is rotating clockwise while the bottoming drum is rotating anti-clockwise.

It will be seen from an inspection of the same drawing that the upper scoring cylinder 32 is equipped with pins 48 projecting from the periphery thereof and that the lower scoring cylinder 34 is provided with a continuous peripheral groove 50 for permitting the scoring rollers to rotate in close proximity to each other despite the projecting pins 48.

It will be apparent that as the leading end of each sack length passes between the scoring cylinders 32 and 34 both walls of the sack length will be punctured by the pins 48 slightly to the rear of the leading end of the upper wall of the sack length, so that the end of the sack length momentarily will become attached to the upper scoring cylinder 32 to be diverted upwardly. As the cylinder 32 rotates sufficiently to bring the end of the sack length just past the "nip" between the cylinder 32 and the bottoming drum 44 one set of the grippers 46 will have been carried by the drum into position to be ready to close upon the projecting flap 4 of the lower wall of the sack length, so as to attach this wall of the length to the drum, and inasmuch as the drum 44 and scoring cylinder are rotating away from each other, the lower wall of the sack length will be pulled from the pins 48, the upper wall, however, remaining impaled upon these pins, to produce an opening action upon the leading end of the sack length, the upper wall 10 of the length beginning to be bent back upon itself along the score 8.

Disposed above and toward the bottoming drum side of the scoring roller 32 is a sack-opening plate 52. This plate which is flat with its forward end turned upwardly as shown at 54, is carried by arms 56 affixed to driven rod 58 which extends transversely of the machine.

The rod 58, at its outer end where it projects through one side frame of the machine carries an arm 60 pivotally attached to crank arm 62.

Mounted on the projecting end of the shaft 64 which carries the upper scoring cylinder 32 is a cam 66. The end of the crank arm 62 lies behind the cam 66 and its end is bifurcated so as to straddle the shaft 64 as seen at 68. The crank arm carries roller 70 which is always maintained in contact with the periphery of the cam 66 by a spring 72.

Figure 8:
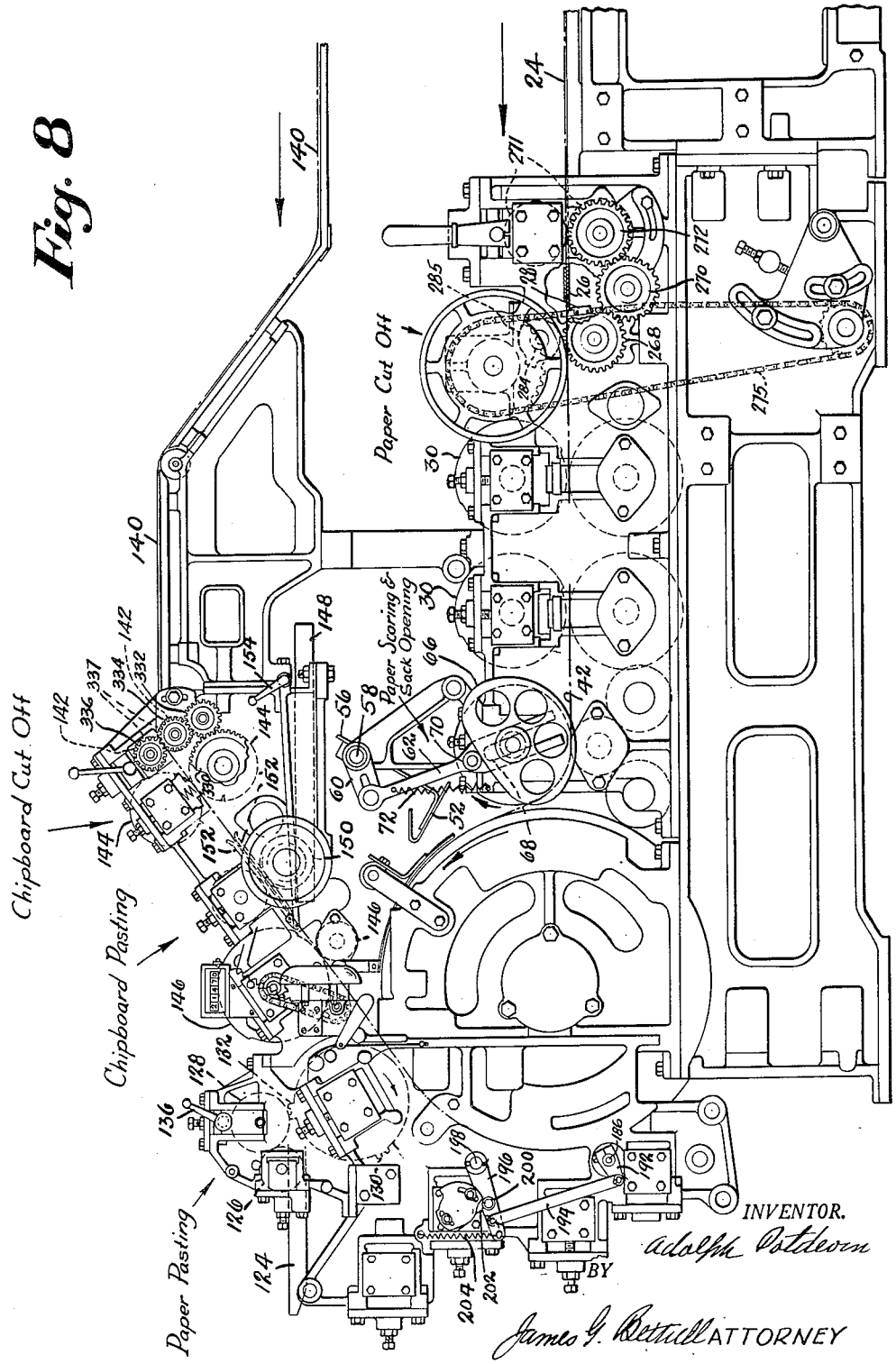
Fig. 8 is an elevational view of one side of the machine embodying this invention.

It will be apparent that with the cam 66 rotating clockwise, as viewed in Fig. 8, the plate 52 will be swung upwardly (clockwise as viewed in Fig. 8) about rod 58 as a center as the high part of the cam rides beneath the cam follower roller 70, and as the cam continues to rotate the plate will be reversed by the action of spring 72 and swing anti-clockwise to enter the open end of the sack length.

The upper wall of the sack length, as above explained, is temporarily attached to the periphery of the upper scoring cylinder 32 and is being carried by the cylinder away from the bottoming drum 44.

Overlying the cylinder 32 and projecting forwardly of the machine toward the bottoming drum are a plurality of stripper fingers 74. These fingers are so positioned that when the scoring cylinder 32 has rotated a predetermined distance, the fingers 74 will pass beneath the edge of the end of the sack length and the upper wall 10 of the sack length will be stripped from the cylinder.

The parts are so synchronized that at about the time the upper wall of the sack length is stripped from the scoring cylinder by the fingers 74 the plate 52 will be beginning its anti-clockwise movement and as this plate moves just clear of the periphery of the bottoming drum 44, and as the bottoming drum is rotating away from the plate 52, the upper wall of the sack length will be folded back upon itself along the scoring 8 as shown in Fig. 4.

In addition to the end grippers 46, the drum 44 carries one or more sets of lateral gripper fingers 76 adjacent the drum ends. For purposes of illustration and description, three pairs or sets of these fingers have been shown, equally spaced about the drum periphery. As will be seen from Fig. 21, for example, these laterals are spaced some distance from the end grippers 46, above referred to. Actually they are so located and timed in their operation as to grip each sack length immediately to the rear of the score 8.

Each of the lateral grippers 76 is affixed to a suitably supported short rod 78 extending lengthwise of the drum 44, the inner end of each of these rods carrying an arm 80, to the outer end of which is affixed one end of a closing spring 82, the other end of this spring being attached to rigid member 84. The grippers 76 are laterally adjustable on their supporting rods 78 to accommodate the machine to handling sacks of various widths.

Figure 20:
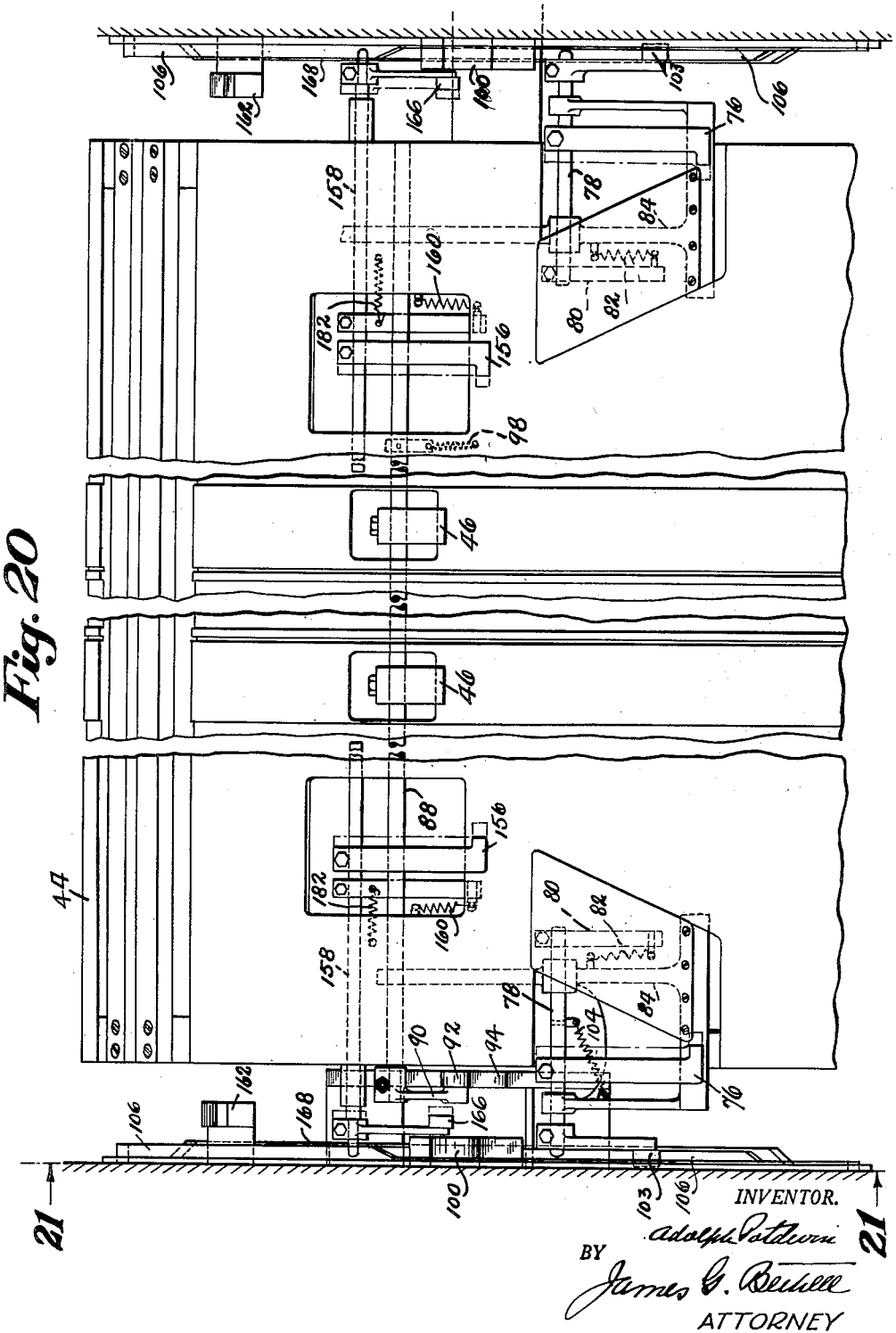
Fig. 20 is a view similar to Fig. 14, but including the cams by which certain lateral fingers carried by the drums are caused to function.

The member 84 is a spider, and there is a spider at each end of the bottoming drum as shown in Figs. 14 and 20. Each of these spiders carries the mounting mechanism for the lateral fingers 76, and may be adjusted circumferentially of the bottoming drum through the medium of the rack and pinion 86 as seen in Figs. 14 and 15. In this way the setting of the fingers 76 may be varied relatively to the gripper fingers 46 circumferentially of the bottoming drum to accommodate the machine to various lengths of bottom.

Reverting to the end gripper fingers 46:

Each set of these fingers is mounted upon a rod 88, each of which extends from one end of the drum to the other, one end of each of these rods carrying arm 90 equipped with cam follower roller 92. The roller 92 is provided for cooperation with end gripper opening cam 94 and gripper release cam 96 which are mounted on the inside of the two side frames of the machine. The grippers are closed and held closed by one or more closing springs 98.

The lateral fingers 76 are closed by springs 82 as already pointed out. Unlike the end grippers 46, the lateral fingers are mounted on individual shafts, and it is therefore necessary to duplicate the opening mechanisms for these fingers at each end of the drum 44.

Figure 21:
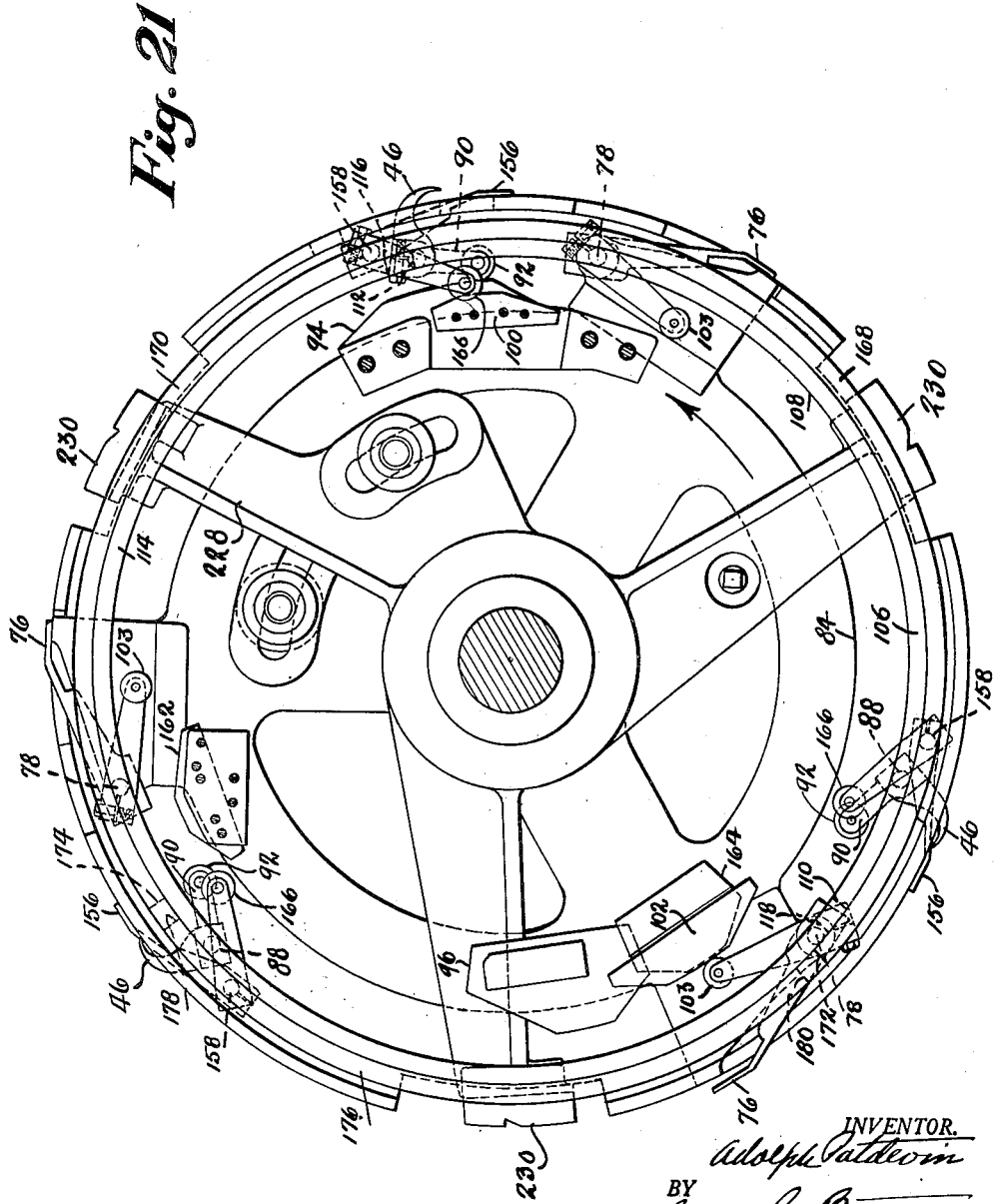
Fig. 21 is an elevational view of the left-hand end of the drum of Fig. 20 in the plane 21—21 of Fig. 20.

Referring to Figs. 20 and 21 of the drawings, it will be seen that opening cams 100 are provided abreast of each other at the two ends of the drum 44. These cams are stationary, being secured to the side frames of the machine, for example.

102 designates another pair of stationary lateral-finger-opening cams, at the two ends of the drum 44. The opening cams 100 and 102 cooperate with rollers 103 carried by an arm affixed to each finger supporting rod 78.

In addition to their opening and closing movements, the fingers 76 have a lateral movement as indicated by the dotted lines in Fig. 20, the fingers being moved inwardly of the drum 44 by a cam action, and in the opposite direction by springs 104.

The cams for effecting the positive inward lateral movement of the fingers 76 are designated 106, there being one of these cams at each end of the bottoming drum 44. These cams are fastened to the side frames of the machine, for example, and hence are stationary.

As will be seen from Figs. 20 and 21, the cams 106 are ring cams, and the inner face of each cam is always contacted by the outer ends of the finger-supporting rods 78, being held in contact with the cam face by the springs 104 above referred to. Each cam has a low area 108 extending from 110 to 112 on Fig. 21 and a high area 114 extending from 116 to 118 on Fig. 21. From Figs. 20 and 21 it will be apparent that when the finger-supporting rods 78 are in engagement with the low or depressed area 108 of the cams 106, the fingers 76, although closed, will be in their outward or inactive position. By the same token when the rods 78 are riding in engagement with the raised portions 114 of the cams, the fingers will be in their inward or active position and closed except when they come abreast of the opening cams 100 and 102.

It will be understood, of course, that the cam 106 at one end of the drum 44 is set in precise register with the cam 106 at the other end of the drum, so that a lateral finger 76 at one end of the drum is performing the same function at the same time as the finger 76 at the other end of the drum.

The sequence of operation of the end gripper fingers 46 and the lateral fingers 76 will be referred to later when a cycle of operation of the machine will be described.

*Mechanism for applying adhesive to the sack length*

As will be seen by comparing Figs. 3 and 4, the next step in the fabricating of the sack is the application of a suitable adhesive 12 to the face of the leading end of the lower wall of the sack length just behind the flap 4 before the chipboard 16 is superimposed upon the paper of the sack body.

The opened end of the sack length is now spread flat upon the surface of the bottoming drum 44, and is held to the drum by the end grippers 46 and the lateral fingers 76. Furthermore, as the bottoming drum rotates anti-clockwise, as viewed in Figs. 18 and 19, it carries the sack length beneath the plates 120 and 122 which overlie the drum, so as to ensure that the length will be held flat to the face of the drum.

As will be seen from Fig. 8, a glue or paste pot, designated 124, is mounted above and to the left of the bottoming drum 44. Rollers 126 and 128 transfer the glue or paste to paste bars 130 and 132.

Referring to Figs. 22-24, it will be seen that the paste bars 130 and 132 extend transversely of the machine, and the active face of each is provided by strips 131 and 133, which can be removed and replaced with strips of different length to accommodate the mechanism to sack lengths of various widths.

360 designates the supporting shaft for the pasting mechanism. Adjacent each end of this shaft are pairs of disc-shaped members 362 and 364, one pair of these discs being keyed to the shaft. One of the paste bars bridges the discs 362 and the other bridges the discs 364, and the bars are set into radial slots provided for that purpose in the discs. The discs 362 and 364 of each pair are held to each other by slot and bolt connection 366, and rack and pinion mechanism 368 is provided whereby one pair of discs may be adjusted circumferentially relatively to the other, which provides for varying the spacing of the paste bars to vary the distance between the paste strips applied to the sack body to accommodate the machine to sack bottoms of various lengths.

The paste bars, as just pointed out, are mounted in radial slots in their disc supporting members 362 and 364. These bars are adapted to be reciprocated in their slots, and each is backed by springs 370. Stops 372 limit the movement of the bars outwardly of their supporting discs. Each end of each of the paste bars is provided with a cam-engaging roller 374 cooperating with cams 376 pivoted to the side frames of the machine at 378. Each cam is in the nature of a lever pivoted at one end, the opposite end being slotted as seen at 380, the slot cooperating with pin 382. Attached to the free end of the cam is a spring 384 tending to hold the free end of the cam in its innermost position, that is, to swing this end of the cam toward shaft 360.

It will be appreciated that in operation the bars 130 and 132 are rotated by shaft 360 to carry their active faces alternately into contact with the face of the transfer roller 128 to receive a charge of adhesive, the bars then contacting alternately the sack length lying upon the face of the bottoming drum 44. It will be appreciated that, as the bars engage the transfer roller 128, they are fully extended, being out of contact with the cams 376. However, as the bars move into position to engage the sack, they will engage the cams 376, pivoting the cams outwardly to the extent permitted by the slots and pins 380 and 382. The slots 380 are of such length that, when the cams are swung to the position shown in Fig. 23, which is the extent of their outward movement, the bars are retracted in position as compared to their fully extended position. This will be apparent from Fig. 23. Inasmuch as the pins 382 engage the inner ends of the slots 380 when the bars engage the sack, it will be apparent that a firm engagement of the bars with the sack is assured.

Means are provided, in addition to the foregoing, to prevent the accidental and undesired application of adhesive to the face of the drum 44 should there be no sack length upon the bottoming drum.

As will be seen from Fig. 22, a rock shaft 386 extends across the machine adjacent the periphery of the bottoming drum, this shaft carrying a plurality of fingers 388, the free ends of which either ride in grooves 390 in the bottoming drum periphery or rest upon a sack length upon the bottoming drum. At each side of the machine the rock shaft 386 is provided with an arm 392 projecting upwardly from the rock shaft and carrying an arm 394 extending toward the cam 376.

The parts are so arranged that with a sack length on the bottoming drum, as illustrated in Fig. 23, the arms or bars 394 will be held in the position illustrated in Fig. 23, the fingers 388 resting upon the sack length. However, when for some reason the machine is turning over with no sack length upon the drum, the fingers 388 will rock into the grooves 390, under which conditions the cams 376 will be locked in their inward position as illustrated in Fig. 24, the cams having been swung inwardly by their springs 384, so that the ends of the bars 394 can engage a notch provided for that purpose in the free end of each cam. Under these conditions, therefore, the paste bars 130 and 132 are prevented by cams 376 from moving outwardly sufficiently to engage the periphery of the bottoming drum, and smearing of adhesive upon the drum face is prevented.

Provision is made for moving the intermediate roller 128 out of contact with the roller 126 and with the paste bars when desired.

In applying the transverse adhesive stripes to the sack length, adhesive is applied to both walls of the sack length, but it is to be noted that in opening the sack length end and folding the upper wall of the sack length back upon itself, the paper is folded in from the sides as above referred to in the form of a triangle as shown at 22, Fig. 4.

This provides a double thickness of paper at the extremities 138 of the base of each triangular area 22, and in applying the adhesive stripes to the sack length, the adhesive extends across the areas 22 at the areas or extremities 138, as shown in Fig. 4. Attention has been directed to this feature at this time because of the reinforcing effect obtained when the chipboard bottom 16 is superimposed upon the sack length, which operation is now to be described.

Chipboard mechanism

The chipboard in strip form and designated 140 is taken off a supply roll at the same end of the machine as the paper, and is continuously advanced by feed rollers 337. Just beyond these feed rollers are cut-off rollers 144, and beyond the cut-off rollers are forwarding rollers 146. Intermediate the cut-off rollers 144 and forwarding rollers 146 is the pasting mechanism for applying paste to the two opposed side edges of the chipboard. This mechanism comprises the paste pot 148 and adhesive-applying rollers 150 at each side of the machine, these rollers rotating in the adhesive in the pot 148. Just above the rollers 150 are two superimposed plates 152. The lower plate is slotted to accommodate the rollers 150, and the chipboard passes between these plates, so that adhesive will be applied to the under surface of the chipboard along the side edges of the same as shown at 18 in Fig. 5.

The plates 152 at their rear end are arranged so that they may be raised slightly by manipulation of the lever 154 to lift the chipboard out of contact with the rollers 150 whenever this may be desired.

In addition to the pasting mechanism described, the shaft 360 carries segmental forwarding and pressing rollers 396 for the chipboard, these rollers not only forwarding the chipboard into superimposed relation to the sack length but pressing the same upon the sack length. As will be seen from Figs. 22 and 25, for example, each of these rollers is made sectional, the sections being held together by slot and bolt 398 so that the active face of each roller may be varied in length to accommodate the machine to chipboard of various lengths.

The paste-applying bars 130 and 132, as understood, are so arranged that the bar 132 applies adhesive to the leading end of the lower wall of the sack length as the same is advanced by the bottoming drum.

The chipboard mechanism, including the forwarding and pressing rollers 396 are so timed with respect to the operation of the bars 132 and 130 that the bar 132 will apply its paste to the lower wall of the sack length, the chipboard will advance so that its leading end will be superimposed upon the sack length just at the rear edge of the adhesive stripe 12, and as the bottoming drum continues to rotate and the chipboard forwarding rollers 396 continue to function, these rollers will press the chipboard progressively into firm contact with the sack length. The chipboard is of such a length that it terminates a short distance short of the trailing end of the upper wall of the sack length, and the parts are so designed and timed, that as the chipboard is placed in position and pressed down, the bar 130 will be in position to apply a transverse stripe of paste across the trailing end of the folded back upper wall of the sack length just to the rear of the chipboard.

The chipboard is shown in Fig. 4 in broken lines in superimposed position relatively to the sack length (the last mentioned adhesive stripe bar being omitted from this view for clarity), and it will be noticed from this figure of the drawings, that the width of the chipboard is such that the sides of the chipboard overlap the sack length. In other words, the pasted sides of the chipboard overlie the outer surface of the sack length, including the corners 138, while the remainder of the chipboard occupies the space between the two pasted areas of the sack length but will not be attached to these areas until they are folded over as will be described presently.

Lateral fingers 156 and associated operating mechanism

The bottoming drum 44 carries lateral fingers 156 for engaging the upper face of the chipboard to grip chipboard and sack length to the drum. It will be appreciated that the end grippers 46 and the lateral fingers 76 are still functioning but these grippers and fingers are only engaging the paper of the sack length and are not so disposed as to engage the chipboard.

Upon reference to Figs. 20 and 21, it will be seen that the drum 44 is provided with a plurality of pairs of lateral fingers 156. Each finger of each pair of fingers is attached to a rod 158, extending lengthwise of the drum and projecting beyond the end thereof. The fingers 156 are held closed by a spring 160 and are opened positively by cams 162 and 164 which are stationary cams mounted on the two side frames of the machine and adapted to be engaged intermittently by cam follower rollers 166.

The fingers 156 have a lateral movement lengthwise of drum 44 similar to the lateral movement of fingers 76 already described. This lateral movement of the fingers 156 of each pair is effected by engagement of the two ends of the finger-supporting rods 158 with a circular or ring cam 168 at each end of the drum 44. Each of these cams has a low area 170 extending from 172 to 174 (see Fig. 21) and a high area 176 extending from 178 to 180 (see Fig. 21). Springs 182 hold the outer ends of the rods 158 in constant engagement with the cam faces. Obviously, therefore, while the rods 158 are traversing the low section 170 of the cam 168, the fingers 156 will be in their outer or full line position illustrated in Fig. 20 and closed. Upon engagement with an opening cam 162 the fingers will open and at the same time be moved laterally inwardly of the drum, remaining in this inward position throughout the traverse of the high area 176 of the cam, the fingers closing as soon as cam 162 is disengaged.

To recapitulate, the grippers 46 and the lateral fingers 76 and 156 function in the order mentioned, and as so far described, all three are now in operating position.

The next requisite in the fabrication of the sack is to fold the leading end, the end which comprises the flap 4, of the sack body over upon the chipboard bottom. Adhesive has already been applied to the sack body as previously described.

*Release for grippers 46 and fingers 156 and folding of the leading end of lower wall of sack length over upon the chipboard*

Obviously, if the leading end of the lower wall of the sack length is to be folded over upon the chipboard, it becomes necessary to release the end grippers 46 which are in engagement with the flap 4. This is accomplished by providing the releasing cam 96, previously referred to, which is in the proper position to be engaged by gripper cam follower roller 92 at the instant the grippers are to open.

The paper of the sack length was initially scored in its upper face along the line 6 so that the tendency of the leading end of the lower wall upon opening of the end grippers is to spring away from the face of the drum 44 in a direction to fold over upon the chipboard. The fingers 156 at this time, however, are still in operating position.

The opening releasing cams for these fingers have been designated 164.

In Fig. 16, folding over of the leading end of the sack length has been illustrated. For clarity of description, the end of the sack length which is to be folded over has been designated 184.

Mounted in the side frames of the machine and extending transversely of the machine is a rod 186. The rod is at the discharge side or to the rear of the bottoming drum 44. This rod, which for clarity will be termed a flap-folding rod, is provided with a plurality of folding lugs 188, four as shown on the drawings (see Fig. 11) adapted to be rocked toward and away from the face of the bottoming drum, the drum periphery being grooved as shown at 190 to accommodate the lugs. One end of the rod 186 is provided with a crank arm 192 pivotally attached to one end of connecting rod 194, which, in turn, is pivotally attached to rocker arm 196 pivoted at 198. The rocker arm 196 carries cam follower roller 200 cooperating with rotary cam 202, shaped to move the connecting rod 194 downwardly to rock the lugs 188 from the full line position of Fig. 16 to the dotted line position of the same drawing, rocking of the lugs in the opposite direction being effected by spring 204.

Cooperating with the lugs 188 is a plate 206 extending across the machine just above the folding lugs 188, this plate being carried by rod 208 mounted in the machine side frames. The rod 208 carries arm and cam follower roller 210 cooperating with rotary cam 212.

The cams 202 and 212 are carried on driven shaft 214 which is mounted for rotation in the machine side frames.

As illustrated in Fig. 16, the mechanism just described provides for rocking the plate 206 toward and away from the leading end of the wall of the sack length which is lying flat upon the bottoming drum 44, just in front of the leading end of the chipboard, while the folding lugs 188 are adapted to be rocked outwardly and inwardly relatively to the bottoming drum. The cams for effecting these movements are so set that the plate 206 will engage the sack length just slightly in advance of the outward movement of the folding lugs 188 so that the flap 184 of the sack length will be folded over upon the chipboard as the bottoming drum continues its rotation.

Fig. 17 illustrates the flap 184 after it has been folded over upon and pasted to the chipboard.

The sides of the chipboard bottom 16 having been pasted to the sack length and the leading flap 184 of the sack length having been folded over and pasted down to the chipboard across the leading end of the same, it only remains for the paper of the sack length to be folded over the trailing end of the chipboard to complete the bottoming operation.

*Mechanism for folding the paper of the sack length over the trailing end of the chipboard*

It will be recalled that in the inital stages of fabrication of the sack, the material of the sack body was scored transversely at 6 (Fig. 2). This is before the end of the sack length has been opened and folded back as illustrated in Figs. 3 and 4.

Due to this scoring it will be appreciated that when the upper wall of the sack length is folded back upon itself and flattened down upon the face of the bottoming drum 44, the scoring in the upper wall of the sack length is on the lower face of the paper, tending to bend the paper toward the drum, instead of away from it which is necessary, of course, to fold the paper over upon the upper face of the trailing end of the chipboard 16.

To score the sack length for the second time, but upon the upper face of the paper, with the sack length opened, a second scoring plate 216 has been provided (see Fig. 13). This plate is attached by brackets 218 to a rocker shaft or rod 220 extending across the machine behind the bottoming drum 44. The rocker rod 220 is non-rotating, in that it merely rocks on its axis but it has a bodily or planetary movement about the axis of driven shaft 214 to which it is attached.

The rocker rod, at one end, carries an arm 222 and cam follower roller 224, which cooperate with a stationary cam 226. This cam is so shaped, as will be seen from Fig. 13, as to cause the scoring plate 216 to engage the upper face of the paper of the sack length at the proper instant as illustrated in Fig. 13, just to the rear of the rear end of the chipboard.

At each end of the bottoming drum and affixed to the drum is a spider 228, and affixed to these spiders and extending across the drum are grooved plates 230 which cooperate with the scoring plate 216 as illustrated in Fig. 13.

It is apparent from the immediately foregoing, that as the plate 216 is rocked inwardly by the action of the stationary cam 226, the paper of the sack length will be scored on its upper face just to the rear of the trailing end of the chipboard 16 to provide or produce a flap 232 which projects outwardly from the drum face.

Cooperating with this second scoring mechanism is a flap folding and presser plate 234.

This plate, which is behind the drum 44, is carried by two driven chains 236, the driven shaft carrying these chains being designated 238.

As will be seen from Fig. 13, the mechanism is so timed that after the paper of the sack length has been scored by the scoring plate 216 and the plate has moved or is moving away from the paper, the flap 232, which is now standing almost normal to the drum face, will be engaged by the folding and presser plate 234 which is traveling at a higher speed than the drum, and folded over upon the trailing end of the chipboard bottom 16.

This completes the fabricating of the sack.

Discharging mechanism for the sack

At the rear of the bottoming drum 44, adjacent the lower part thereof, is a fixed bar 240 carrying a plurality of fixed sack deflecting and discharge members 242. These deflectors extend inwardly slightly beyond the face of the drum 44 so that the leading end of each sack will engage them, the drum periphery being grooved at 244 to accommodate the ends of these members. The upper edge of each deflector or deflector plate is concaved so that the sack will be deflected outwardly in a curved path.

Mounted to the rear of the bottoming drum and at a slightly higher level than the deflectors 242 are a plurality of discharge belts 246 driven from shaft 248. The pulleys for these belts are designated 250, 252 and 254.

From Fig. 12 it will be seen that from pulley 252 to 254 the lower reach of the belts have a straight run. Underlying this portion of the belts is another belt 256 running in the same direction. The sacks as they are deflected by the deflecting plates 242 pass between the two belts 246 and 256 to be discharged from the machine and conveyed to a stacker or other point desired.

The driving mechanisms

The driving mechanisms for the various parts of the machine are best illustrated in Figs. 8 and 9.

Referring to these two figures of the drawings, it will be seen that the main driving motor for the machine is designated 258.

The drive for the first set of forwarding rollers is from motor 258, gears 260, 262, pinion 264, gear 266, across the machine to gear 268, idler 270, gear 272 to drive the forwarding rollers 271.

The cut-off chain 275 for the paper is driven through gears 262 and 274.

The slack-producing roller 285, forming part of the paper cut-off mechanism is driven from pinion 264, gear 266, gear 280, which is on the same shaft as gear 266, and gear 282 which is on shaft 284 of the slack-producing roller.

The second set of forwarding rollers 30 are driven from pinion 264, gears 286 and 288 for the first pair of these rollers, pinion 290 and the gears 292 and 294 for the second pair of these rollers.

The scoring cylinders 32 and 34 are driven from gear 292, intermediate gear 296 and scoring cylinder gears 298 and 300.

The drive for the bottoming drum 44 and for the chain 236, the latter constituting part of the folding mechanism for folding the flap 4 of a sack length over upon the chipboard, may be traced from gear 298, gears 302 and 303 to the bottoming drum, and gears 303, 314, 316 and 318 to the chain 236.

The drive for the rollers by which paste is applied to the paper sack length may be traced from gear 303 through gears 304, 306, 308, 310, 311 and 312.

For advancing the chipboard, the drive may be traced from gear 262, bevel gears 320, shaft 322, bevel gears 324, gears 326, 328, across the machine to gear 330, gears 332, 334, 336, to the forwarding rollers which have been designated 337.

The drive for the cut-off for the chipboard is from 328 to 338.

The forwarding rollers for advancing the chipboard lengths are driven from pinion 326, gears 340, 342, 344, 346 and 348.

A cycle of operation

From all of the foregoing, it is thought the operation of the machine will be apparent.

The paper 24 and the chipboard 140 are taken from appropriate supply rolls, not shown, at the charging end of the machine and the paper passes through tubing mechanism, not shown, continuously to be formed in a tube by folding the longitudinal edges of the paper into overlapping relation and pasting them together.

As the paper tube passes through the cut-off mechanism 26 and 28 it is cut off successively into sack lengths, the cut-off being such as to provide the projecting flap 4 on the lower wall of the sack length at its leading end.

These sack lengths are forwarded longitudinally by the forwarding rollers 30 until they reach the scoring cylinders 32 and 34.

These cylinders score the paper by the engagement of the scoring blades with the upper face of the sack length while the tube is in engagement with lower scoring cylinder 34. This operation scores the sack length transversely at 6 and 8, Fig. 2.

During this scoring operation the sack length at its leading end becomes impaled upon the pins 48 carried by the upper scoring cylinder 32. These pins puncture the sack length to the rear of the flap 4 of the sack length.

The scoring mechanism is so timed with respect to the bottoming drum 44, that when the sack length comes up to the drum a set of end grippers 46, carried by the drum will be in the right position to grip the projecting flap 4 of the sack length, thereby attaching the leading end of the lower wall of the sack length to the drum.

The upper wall of the sack length is still impaled upon the pins 48 of scoring cylinder 32.

The lateral fingers 76 next function to clamp the sack length to the drum 44 at each side of the length, just at the scoring 8, and are timed to clamp at or about the center line of the drum and scoring cylinder.

As illustrated in Fig. 19, the opening plate 52 next functions to open the leading end of the sack length, the stripper fingers 74 stripping the upper wall of the sack length from the upper scoring cylinder 32 so that eventually the opened end of the sack length is flattened down against the drum periphery, and is held in place by the gripper fingers 46 and the lateral fingers 76.

Meanwhile the chipboard 140 is being advanced continuously and cut into successive lengths and paste applied to the under surface of each length longitudinally thereof along the two side edges of each length.

As the sack length comes up to the mechanism illustrated in Figs. 22 to 24, a transverse stripe of adhesive is applied to the leading end of the lower wall just behind the flap 4, the chipboard is advanced into superimposed relation to the sack length and pressed down by the forwarding and presser rollers 396, and as this operation is completed, paste is applied transversely to the trailing end of the folded back upper wall of the sack length just behind the chipboard.

Upon release of the end grippers 46, the leading end of the lower wall of the sack length is folded over upon the chipboard by the mechanism above described, the trailing end of the upper wall of the sack length is folded over, and the fingers 156 and 76 are released in the order mentioned as the forward end of the sack begins to enter the discharge mechanism. As the leading end of the sack engages the deflecting plates 242, it will be deflected away from the bottoming drum 44, so that the sack will pass between the discharge belts 246 and 256 to be discharged to suitable stacking mechanism or any other point desired.

It will be seen from all of the foregoing that the present invention provides a machine for making sacks which is fully automatic in operation, the sack comprising a paper body and a chipboard bottom as distinguished from a paper bag.

It is to be understood that changes in details of construction and arrangement of parts may be made within the purview of this invention.

What is claimed is:

1. In a sack-making machine, the combination of means for opening the leading end of a tubular sack length and folding a wall thereof back upon itself to provide a flattened area composed of one wall of the sack length, the folded-back wall of the sack length with the sides of the tube folded inwardly in overlapping relation to the two walls, adhesive applying means for applying a transversely extending stripe of paste to the upper face of one wall of the sack length at the leading end thereof, and to the end of the folded-back wall, means for severing a bottoming member for the sack from a continuous strip of bottoming material, adhesive-applying means for applying a stripe of adhesive to the surface of the bottoming member along the two side edges of the bottoming member, forwarding means for advancing the bottoming member into superimposed relation to the flattened area of the sack length with the ends of the bottoming member lying between the said transverse adhesive stripes and with the adhesive-striped portions of the bottoming member contacting the inwardly turned portions of the sack length at the flattened area, and folding means for folding the adhesive-striped end of each of the sack length walls over upon and into contact with the ends of the said bottoming member.

2. In a sack-making machine, the combination of a rotatable bottoming drum, grippers and lateral fingers carried by the drum for attaching a tubular sack length thereto with the lower wall of the tube against the drum face and the upper wall turned back upon itself, said lateral fingers overlying both walls of the tube, forwarding means for advancing a bottoming member into superimposed relation upon the flattened tube end thus provided, means for folding the leading end of the lower wall of the sack length over upon the upper face of the bottoming member, said folding means comprising a plurality of folding lugs, a rocker rod mounting said lugs, cam mechanism for rocking said rod to rock the free end of the lugs toward and away from the face of said drum, the periphery of the drum being grooved so that with the free ends of said lugs in their inward position, they will be slightly below the drum surface, a release cam for said grippers, this cam and the cam for the lugs being so timed that as the leading end of the sack length is advanced to the said lugs the gripper cam will release the grippers and the lugs will move the end of the lower wall of the sack length outwardly and upon further rotation of the drum cause this portion of the lower wall to be folded over upon the leading end of the bottoming member with the said lateral fingers in operating position.

3. In a sack-making machine, a rotatable bottoming drum, means for temporarily attaching a sack length and a bottoming member thereto in superimposed relation, with the leading end of the lower wall of the sack length projecting beyond the leading end of the bottoming member, folding lugs mounted adjacent the face of the bottoming drums, said lugs being non-rotatable, a cam-actuated rocker rod mounting said lugs and adapted to rock the free ends of the lugs toward and away from the bottoming drum face, peripheral grooves in the face of said drum whereby when said lugs are in their innermost position their free ends will be below the drum surface, a plate adjacent the drum surface adapted to be rocked into engagement with the lower wall of the sack length at the leading end of the bottoming member, said plate moving to this position as the sack length is advanced by the bottoming drum, said folding lugs then being rocked outwardly as the leading end of the sack length moves into overlapping relation to the lugs, to fold the leading end of the lower wall over upon the leading end of the bottoming member, a cam for controlling said plate and shaped to effect retraction of the plate away from the sack prior to completion of the folding operation performed by said lugs.

4. In a sack-making machine, the combination of a bottoming drum, means for securing a sack length to the face thereof with the lower wall of the sack length in contact with the drum and with the upper wall of the sack length at its leading end turned back upon itself, a bottoming member superimposed upon the flattened end of the sack length, so that the trailing end of the turned back portion of the sack length projects beyond the trailing end of the bottoming member, means for scoring the upper face of the said projecting portion of the sack length just at the rear or trailing end of the bottoming member, said means comprising a scoring plate, and a fixed cam cooperating with the scoring plate in timed relation to the bottoming drum, whereby at a predetermined instant the scoring plate will be swung or rocked toward the bottoming drum into contact with the upper face of the turned back portion of the upper wall of the sack length to score the said face along the trailing end of the bottoming member to cause this end of the wall to spring outwardly away from the drum face.

5. In a sack-making machine, the combination of a rotatable bottoming drum, means for attaching a tubular sack length thereto with the lower wall of the tube flat against the face of the drum and with the upper wall adjacent its leading end folded back upon itself and flattened down, and with a bottoming member superimposed upon the flattened area of the end of the sack length, the trailing end of the turned back portion of the upper tube wall projecting beyond the trailing end of the bottoming member, a pair of driven chains adjacent the periphery of the bottoming drum, a scoring plate, a fixed cam cooperating with the scoring plate in timed relation to the bottoming drum, whereby at a predetermined instant the scoring plate will be rocked into engagement with the upper face of the turned back portion of the upper wall of the tube just to the rear of the trailing end of the bottoming member to cause the projecting portion of this wall to spring outwardly away from the drum, and a folding plate attached to said chains adapted to be carried thereby into contact with the said outwardly turned portion of the tube wall to fold the same over upon the face of the bottoming member.

6. In a machine for making sacks, the combination of a bottoming drum, forwarding rollers for advancing tubular sack lengths successively toward the bottoming drum, scoring cylinders intermediate the forwarding rollers and the bottoming drum for scoring each sack length transversely adjacent its leading end and a substantial distance to the rear of its leading end, means for gripping the leading end of the lower wall of each sack length to the face of the bottoming drum and means temporarily for attaching the other wall of the sack length to one of said scoring cylinders, said bottoming drum and said last mentioned scoring cylinder being rotated away from each other whereby the leading end of each sack length will be opened and the wall which is attached to the scoring cylinder folded back upon itself along the line of the second mentioned scoring, thereby to provide a flattened area at the leading end of sack length for the reception of a bottoming member, paste-applying means in the path of the sack length as it is advanced by the bottoming drum for applying a transverse stripe of adhesive to the leading end of the lower wall of the sack length and the trailing end of the folded back upper wall, forwarding means operating in timed relation to the bottoming drum for advancing bottoming members successively in a path converging upon the path of rotation of the bottoming drum, paste-applying means for applying a stripe of adhesive to the under side of each bottoming member along the side edges thereof, the bottoming member arriving at the bottoming drum simultaneously with the arrival of the flattened area of a sack length, whereby the bottoming member becomes superimposed upon the flattened area of the sack length, folding means for folding the leading end of the lower wall of the sack length over upon the upper face of the leading end of the bottoming member, scoring means thereafter operable to score the folded back portion of the upper wall just to the rear of the trailing ends of the bottoming member, folding means for folding this wall along said scoring over upon the trailing end of the bottoming member, and discharge mechanism for discharging the bottomed sack length from the machine.

7. In a machine of the class described wherein the end of a tubular sack body is opened and one wall of the body folded back upon itself to produce a flattened area for the reception of a bottoming member which is to be superimposed thereon as the sack body is advanced by a rotatable bottoming drum, the combination of a driven adhesive-transfer roller, adhesive-applying bars receiving adhesive from the said roller, said bars being positioned intermediate the bottoming drum and said transfer roller, rotatable members supporting said bars and carrying the same successively into contact with the transfer roller and with the flattened area of a sack body being advanced by the bottoming drum, said bars being movable radially of said rotatable members, a cam operable to move said bars inwardly radially of the rotatable members during contact of the bars with the flattened area of the sack body, said cam being pivoted, and locking means for the cam comprising an arm adapted to engage the drum periphery for locking said cam in position to effect maximum inward movement of the said bars radially of their rotatable supporting members to avoid application of adhesive to the face of the bottoming drum in the absence of a sack body upon the drum.

8. In a sack making machine, comprising a rotatable bottoming drum, means for applying stripes of adhesive to a sack body carried by the drum, said means comprising in combination a pair of adhesive-applying bars, rotatable members for supporting the same, said bars being mounted in said supporting members so as to reciprocate radially thereof, a loading spring for each bar tending to move the bars outwardly of their supporting members, a pivoted spring-loaded cam, means carried by said bars adapted alternately to engage said cam to effect inward movement of the bars as the bars are carried into proximity to the periphery of the bottoming drum, a pivoted arm adapted to rest upon a sack body carried by the bottoming drum, and adapted to engage the drum periphery when no sack body is present, and locking means adapted to be actuated by said arm, to hold the same out of cam locking position as a sack body upon the bottoming drum passes beneath the arm, movement of the arm into engagement with the drum locking said pivoted cam in its extreme inward position to prevent normal outward movement of said bars, thereby to prevent the application of adhesive to the face of the bottoming drum.

9. In a sack making machine, comprising a rotatable bottoming drum, means for applying stripes of adhesive transversely of a sack body carried by the drum, said means comprising in combination a shaft extending transversely of the machine, a plurality of discs adjacent each end of said shaft, adhesive-applying bars bridging said discs, said discs being rotatably adjustable relatively thereby to vary the spacing of said bars and hence the spacing of the adhesive stripes upon a sack body carried by the bottoming drum, radial slots in said discs for receiving the ends of said bars, springs for loading said bars and tending to move the same outwardly radially of the discs, a pivoted cam, a spring for pivoting the free end of the cam away from the bottoming drum, means carried by the bars for engaging said cam to force the same toward the drum periphery sufficiently to permit the bars to engage a sack body carried on the face of the bottoming drum, and locking means comprising a finger adapted to rest upon the drum periphery and to be raised by a sack body passing between it and the face of the bottoming drum, cam finger, when in drum-engagement position, holding the locking means in position to lock the free end of the same in its extreme position away from the drum, to prevent outward movement of the bars beyond their extreme inward position.

10. In a sack making machine wherein a bottoming member is to be adhesively secured to a flattened area at the end of the sack body while the latter is being advanced by a bottoming drum, rotatably mounted adhesive-applying and presser mechanism, and comprising in combination a plurality of adhesive-applying bars extending transversely of the path of advance of the sack body, rotatable members carrying said bars, said members being adjustable relatively to vary the spacing of the bars, and presser members intermediate said rotatable members and rotating on the same axis as the rotatable members for pressing a bottoming member into firm contact with the flattened area of the sack body.

11. In a sack making machine wherein a bottoming member is adhesively secured to a flattened area at the end of the sack body while the latter is being advanced by a bottoming drum, adhesive-applying bars for applying a stripe of adhesive across the leading end of the sack body and across the trailing end of said flattened area, rotatable members carrying said bars, a shaft carrying said rotatable members, and presser members carried by said shaft intermediate the said rotatable members for engaging a bottoming member being advanced into superimposed relation to the flattened area of the sack body, said presser members being adjustable to vary the effective length of their peripheries to accommodate bottoming members of different lengths.

12. In a machine of the class described wherein a tubular sack body is carried by a rotatable drum, and wherein one end of the body is opened and one wall thereof folded back upon itself to produce a flattened area for the reception of a separate bottom which is to be superimposed thereon, the combination of an adhesive-transfer roller, adhesive-applying bars, rotatable members carrying said bars successively into contact with said roller and with the said sack body, springs for moving said bars outwardly radially of said rotatable members into contact with said adhesive transfer roller, a cam pivoted to a fixed part of the machine for retracting said bars from their extreme outward position as the same are carried by the rotatable members into contact with the sack length, and locking means for the cam for locking the cam in position to effect further retraction of the bars, said locking means comprising a finger overlying the bottoming drum and adapted to contact the same to lock the cam in position fully to retract the said bars, said finger rising upon the passage of the sack length beneath the same to unlock the cam to permit the bars to move to the retracted position first mentioned.

ADOLPH POTDEVIN.

References Cited in the file of this patent
UNITED STATES PATENTS

| Number | Name | Date |
|---|---|---|
| 333,523 | Honiss | Jan. 5, 1886 |
| 714,386 | Matteson | Nov. 25, 1902 |
| 1,333,285 | Smith | Mar. 9, 1920 |
| 1,453,294 | Taggart | May 1, 1923 |
| 1,571,983 | Weber | Feb. 9, 1926 |
| 1,690,626 | Duvall | Nov. 6, 1928 |
| 1,721,399 | Klein | July 16, 1929 |
| 1,953,432 | Potdevin | Apr. 3, 1934 |
| 2,097,428 | Bergstein | Nov. 2, 1937 |
| 2,098,970 | Novick | Nov. 16, 1937 |
| 2,125,308 | Novick | Aug. 2, 1938 |
| 2,126,920 | Potdevin | Aug. 16, 1938 |
| 2,249,451 | Bischoff | July 15, 1941 |
| 2,324,358 | Burroughs | July 13, 1943 |